(12) United States Patent
Lee

(10) Patent No.: US 6,997,586 B2
(45) Date of Patent: Feb. 14, 2006

(54) STRUCTURE FOR MAINTAINING CLEARANCE BETWEEN HEADLAMP AND FENDER OF VEHICLE

(75) Inventor: Jae Hun Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 58 days.

(21) Appl. No.: 10/751,049

(22) Filed: Dec. 31, 2003

(65) Prior Publication Data

US 2005/0047163 A1    Mar. 3, 2005

(30) Foreign Application Priority Data

Sep. 1, 2003    (KR) .................... 10-2003-0060659

(51) Int. Cl.
*B60Q 1/04* (2006.01)
(52) U.S. Cl. .................. 362/507; 362/505; 362/506
(58) Field of Classification Search ............... 362/505, 362/506, 507, 546, 549, 368, 370, 432, 457, 362/458
See application file for complete search history.

(56) References Cited

U.S. PATENT DOCUMENTS

| | | | |
|---|---|---|---|
| 4,636,921 A | * | 1/1987 | Vollrath ...................... 362/549 |
| 4,797,792 A | * | 1/1989 | Oen ............................ 362/485 |
| 6,257,749 B1 | * | 7/2001 | Ward et al. ................. 362/549 |

FOREIGN PATENT DOCUMENTS

| | | |
|---|---|---|
| JP | 06-144107 | 5/1994 |
| JP | 08-119030 | 5/1996 |
| JP | 11-011580 | 1/1999 |
| JP | 2002-264745 | 9/2002 |
| JP | 2002-326585 | 11/2002 |

* cited by examiner

*Primary Examiner*—Y. My Quach-Lee
(74) *Attorney, Agent, or Firm*—Morgan Lewis & Bockius LLP

(57) ABSTRACT

A structure for maintaining clearance between a headlamp and a fender of a vehicle is capable of significantly enhancing a visual outer appearance of the vehicle. By decreasing a length of a dummy section formed in a lateral side of a headlamp lens and removing a hole processing flange formed in a front end of a fender.

3 Claims, 2 Drawing Sheets

STRUCTURE FOR MAINTAINING CLEARANCE BETWEEN HEADLAMP AND FENDER OF VEHICLE

CROSS-REFERENCE TO RELATED APPLICATIONS

This application claims priority of Korean Application No. 10-2003-0060659, filed Sep. 1, 2003, the disclosure of which is incorporated fully herein by reference.

FIELD OF THE INVENTION

Generally, the present invention relates to a structure for maintaining a clearance between a headlamp and a fender of a vehicle. More particularly, the structure is capable of significantly enhancing a visual outer appearance of a section contacting a headlamp and a fender by decreasing a length of a dummy section formed in a lateral side of a lens of the headlamp and removing a hole processing flange formed in a front end of the fender.

BACKGROUND OF THE INVENTION

Generally, vehicle headlamps include a lamp housing adapted to engage a bulb, a reflector attached to a front surface of the lamp housing for reflecting the light of the bulb, and a lens provided in front of the reflector and the bulb and engaged with the lamp housing. Often, an insertion groove is formed in a front surface of a rim of the lamp housing. An insertion end is formed in a back surface of the rim of the lens. The insertion end of the lens is inserted into the insertion groove of the lamp housing, and a gap between the insertion end and the insertion groove is sealed using a certain sealant. Thus, finishing an engagement between the lamp housing and the lens.

When the headlamp is engaged to a vehicle in an assembling line, a lower side of the lens of the headlamp contacts with a bumper cover, a lateral end of the lens contacts with a front end of the fender, and the upper end makes contact with a hood panel.

According to an engaging structure between the conventional headlamp and a vehicle body in Japanese patent laid-open No. 2002-326585, a hole is formed in a protrusion member attached to a headlamp and a hole formed in a lower side of a fender are aligned with each other. The protrusion portion is then inserted into the holes for achieving an engaged structure. Additionally, according to the Japanese patent laid-open No. 2002-264745, a fender and a lamp housing are engaged with respect to a bumper casing and a gap and a step formed due to the engagement are decreased. According to the Japanese patent laid-open No. Hei 8-119030, a gap formed between a front surface fender and a finish is prevented using a piece. In addition, according to the Japanese patent laid-open no. Hei 6-144107, a hole is formed in a vehicle body and a protrusion formed in a lamp casing is inserted into the hole, so that a gap formed in the lamp is decreased.

Conventionally, clearance is maintained between the lens and the fender by a flange having a size of about 4~5 mm that is integrally formed in a front end of the fender 10. A hole-processing flange has a length of about 12 mm and is longitudinally formed at an intermediate portion of the flange. In addition, a protruded guide boss is integrally formed in a back surface of the rim of the lamp housing. Therefore, when assembling the lamp, the guide boss, integrally formed in the back surface of the rim of the lamp housing, is inserted through the hole of the hole processing flange so that the headlamp and the fender are assembled with each other. At the same time, a clearance between an end portion of the lateral side of the lens and a front end of the fender is uniformly maintained. At this time, a clearance of about 10 mm is formed between the front end of the fender and an end portion of the lateral side of the lens. However, actually a dummy section of 10 mm is formed in an end portion of the lateral side of the lens, so that the clearance of about 10 mm is effectively covered.

However, in the conventional art, the hole-processing flange of 12 mm should be additionally formed in the flange of the fender. In addition, since there is provided the hole-processing flange, the dummy section of about 10 mm should be additionally formed in an end portion of the lateral side of the lens. Therefore, mold processing is difficult and the fabrication cost is increased. In particular, since the dummy section (the portion contacting with the front end of the fender) of the lens does not belong to the range of a shape design, a visual outer appearance of the vehicle is significantly degraded.

SUMMARY OF THE INVENTION

An embodiment of the present invention provides a structure and method for maintaining a clearance between a headlamp and a fender of a vehicle. The structure and method are capable of significantly enhancing a visual outer appearance with respect to a section contacting an end portion of a lateral side of a lens of a headlamp and front end of a fender. A hole processing flange, adapted in a conventional clearance maintaining structure between a headlamp and a fender is removed, and a length of a dummy section formed in an end portion of a lateral side of a lens of a headlamp is significantly decreased. A lamp housing for engaging a lens, a fender, and a bumper cover are engaged to a certain portion using a bracket.

In a preferred embodiment, there is provided a structure for maintaining a clearance between a headlamp and a fender of a vehicle. The structure comprises a bracket formed in such a manner that an upper plate has a guide hole and a lower plate has an engaging hole. The plates are integrally formed therein, wherein the lower plate is closely contacted with a lower surface of a front side of the fender that is closely contacting an upper surface of a rear end of the bumper cover, and the lower plate of the bracket, the bumper cover and the fender are fixed together using bolts passing through the engaging hole of the lower plate, and a guide boss formed in a back surface of a rim of the lamp housing is inserted through the guide hole of the upper plate.

A dummy section, formed in an end portion of a lateral side of the lens, has a length of 5 mm which includes a thickness of the lens. The length of a flange formed in a front end of the fender is 3.5 mm. The guide boss of the lamp housing is integrally formed in a back surface of the insertion groove of the lamp housing, into which an insertion end of the lens is inserted.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF PREFERRED EMBODIMENTS

Figure 1:
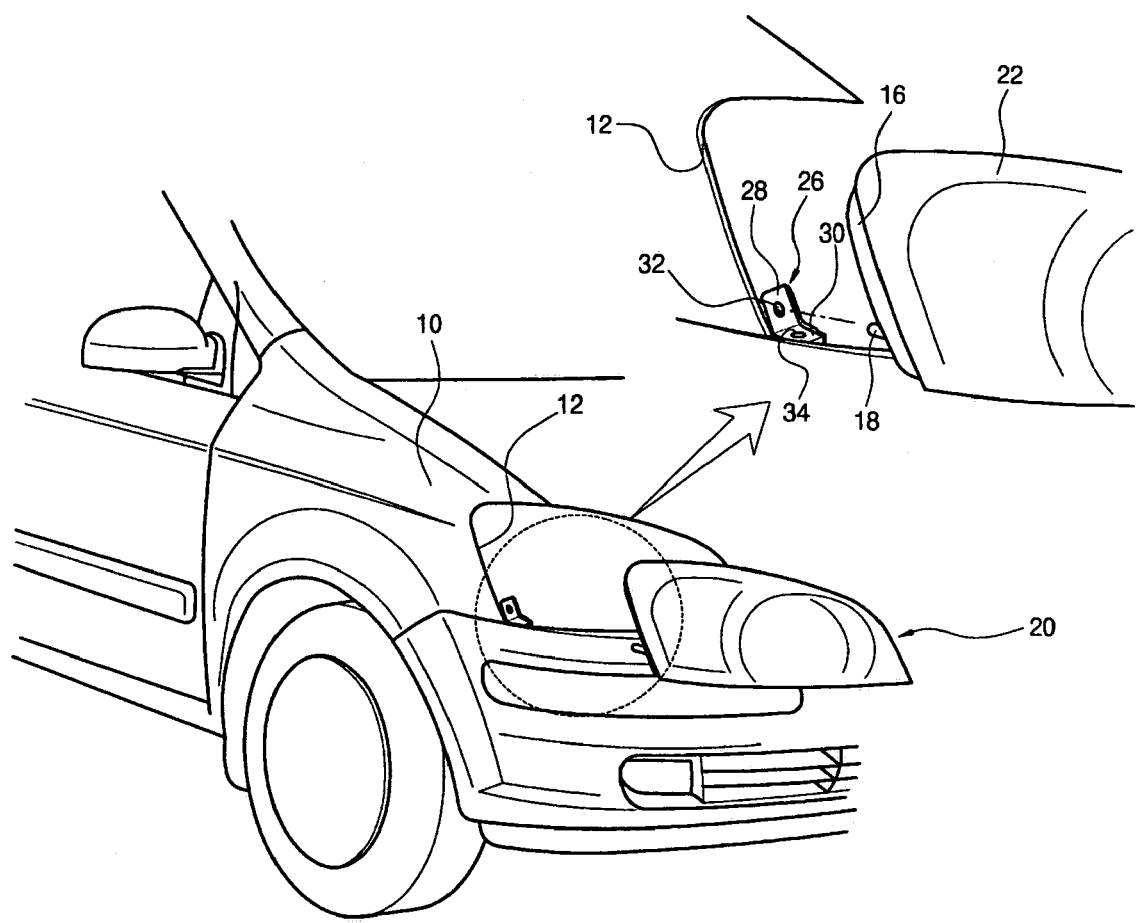
FIG. 1 is a disassembled perspective view illustrating a structure for maintaining a clearance between a headlamp and a fender of a vehicle according to an embodiment of the present invention.
Figure 2A:
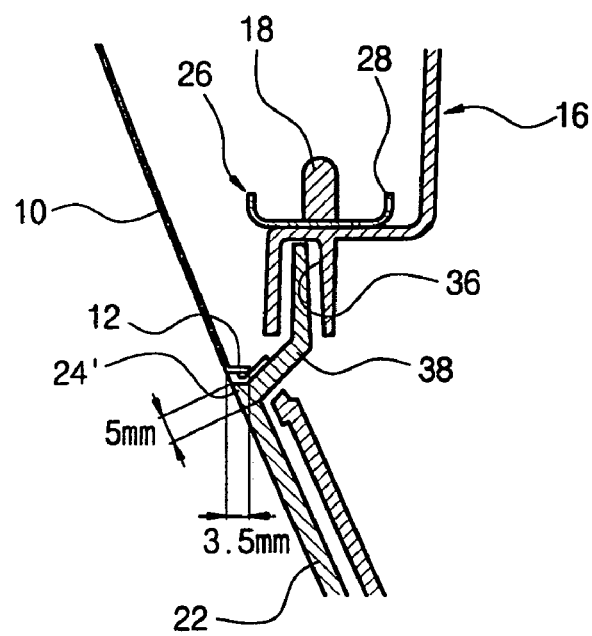
FIGS. 2A and 2B are cross sectional views illustrating a structure for maintaining a clearance between a headlamp and a fender of a vehicle according to an embodiment of the present invention.
Figure 2B:
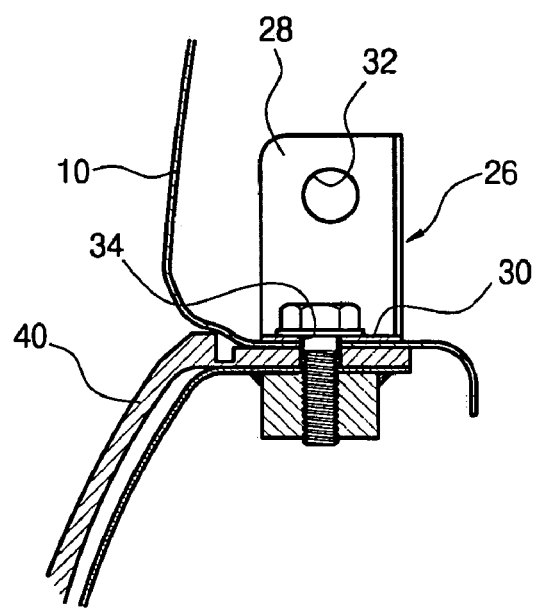

FIG. 1 is a disassembled perspective view illustrating a structure for maintaining clearance between a headlamp and a fender of a vehicle, and FIGS. 2A and 2B are cross sectional views. In the present invention, the three elements of a headlamp, a bumper and a fender are engaged at one portion using a bracket. Therefore, it is possible to effectively and easily handle a clearance between an end portion of a lateral side of a lens and a front end of the fender.

The bracket 26 is a plate shaped member in which an upper plate 28 and a lower plate 30 are bent at an obtuse angle. A guide hole 32 is formed in the upper plate 28, and an engaging hole 34 is formed in the lower plate 30. An insertion hole 36 is formed on a front surface of the rim of the lamp housing 16. An insertion end 38 is integrally formed on a back surface of the rim of the lens 22. The lamp housing 16 and the lens 22 of the headlamp 20 are engaged by inserting the insertion end 38 of the lens 22 into the insertion groove 36 of the lamp housing 16.

A guide boss 18 is integrally formed in the lamp housing 16. In the present invention, the guide boss 18 is integrally provided on the back surface of the insertion groove 36 of the lamp housing. The guide boss 18 is outwardly extended from the insertion groove 36 of the lamp housing and is backwardly protruded. The insertion end 38 of the lens 22 is inwardly bent from the end of the lateral side and is integrally formed. The length of the dummy section 24' of the lens 22 is about 5 mm corresponding to the thickness of the lens. Furthermore, the flange 12 has the length of about 3 to 4 mm.

Here, the construction of the bumper 40, the fender 10, and the lamp housing 16 of the headlamp 20 will be described. In general, the lower end of the front side of the fender 10 is closely contacted with the upper surface of the bumper cover 40 to the upper surface of the rear end. At this time, the lower plate 30 of the bracket 26 is closely contacted with the lower end surface of the front side of the fender 10 and closely contacting with the upper surface of the rear end of the bumper cover 40. Thereafter, bolts are inserted to hold the sections together through the engaging hole 34 of the lower plate 30. As shown in FIG. 2B, the lower plate 30 of the bracket 26 and the bumper cover 40 of the fender 10 are fixed together.

As shown in FIG. 2A, the guide boss 18, formed in the back surface of the rim of the lamp housing 16, is inserted through the guide hole 32 formed in the upper plate 28 of the bracket 26, so that the lamp housing 16 of the headlamp 20 is engaged with respect to the bracket 26. Therefore, the fender 10, the bumper cover 40, and the lamp housing of the headlamp 20 are engaged at one portion by the bracket 26.

In a state that the fender 10, the bumper cover 40, and the lamp housing 16 are engaged the dummy section (having the length of 5 mm corresponding to the thickness of the lens) is more closely contacted with the front surface of the flange 12 (having the length of 3.5 mm) such that it is possible to significantly enhance the visual outer appearance of the system.

As described above, in the structure for maintaining a certain clearance between the headlamp and the fender of a vehicle, the hole processing flange formed in the flange of the fender of the conventional art is removed, and the length of the dummy section formed in the end portion of the lateral side of the lens of the headlamp is significantly decreased. The lamp housing, adapted to fix the lens, the fender, and the cover are engaged at one portion using the bracket, so that it is possible to enhance a visual outer appearance of the portions in which the end portion of the lateral side of the lens of the headlamp contacts with the front end of the fender. Additionally, since the lamp housing of the headlamp, the fender, and the bumper cover are engaged at one portion using the bracket, an easier engagement process is achieved. Therefore, it is possible to easily maintain a certain clearance between the end portion of the lateral side of the lens of the headlamp and the front end of the fender.

What is claimed is:

1. A structure for maintaining a certain clearance between an end portion of a lateral side of a lens of a headlamp and a front end of a fender, the structure comprising:
    a bracket formed in such a manner that an upper plate having a guide hole and a lower plate having an engaging hole are integrally formed therein;
    wherein the lower plate is closely contacted with a lower surface of a front side of the fender that is closely contacting with an upper surface of a rear end of a bumper cover, and the lower plate of the bracket;
    wherein the bumper cover and the fender are fixed together using bolts passing through the engaging hole of the lower plate; and
    a guide boss formed in a back surface of a rim of a lamp housing of the headlamp is inserted through the guide hole of the upper plate.

2. A structure according to claim 1, wherein a dummy section formed in the end portion of the lateral side of the lens has a length of about 5 mm including a thickness of the lens, and the length of a flange formed in the front end of the fender of about 3.5 mm.

3. A structure according to claim 1, wherein said guide boss of the lamp housing is integrally formed in a back surface of an insertion groove of the lamp housing into which an insertion end of the lens is inserted.

* * * * *

UNITED STATES PATENT AND TRADEMARK OFFICE
CERTIFICATE OF CORRECTION

PATENT NO. : 6,997,586 B2 Page 1 of 1
APPLICATION NO. : 10/751049
DATED : February 14, 2006
INVENTOR(S) : Jae Hun Lee It is certified that error appears in the above-identified patent and that said Letters Patent is hereby corrected as shown below:

On the front page:

Left column, line (73)

"Hyundai Motor Company, Seoul (KR)"
should be changed to

-- Kia Motors Corporation, Seoul (KR)--.

Signed and Sealed this

Twenty-seventh Day of March, 2007

JON W. DUDAS
*Director of the United States Patent and Trademark Office*